United States Patent
Huang et al.

(10) Patent No.: US 8,184,227 B2
(45) Date of Patent: May 22, 2012

(54) FLAT DISPLAY PANEL AND METHOD OF REPAIRING CONDUCTIVE LINES THEREOF

(75) Inventors: Wei-Kai Huang, Hsin-Chu (TW);
Chieh-Wei Chen, Hsin-Chu (TW);
Chun-Wei Chiang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 499 days.

(21) Appl. No.: 12/538,872

(22) Filed: Aug. 11, 2009

(65) Prior Publication Data

US 2010/0201903 A1 Aug. 12, 2010

(30) Foreign Application Priority Data

Feb. 6, 2009 (TW) ................................ 98103822 A

(51) Int. Cl.
*G02F 1/1333* (2006.01)
*G02F 1/1343* (2006.01)
*G02F 1/13* (2006.01)

(52) U.S. Cl. ............. 349/54; 349/55; 349/139; 349/192

(58) Field of Classification Search .................... 349/54, 349/55, 139, 192
See application file for complete search history.

(56) References Cited

U.S. PATENT DOCUMENTS

| | | | |
|---|---|---|---|
| 6,403,980 B1 * | 6/2002 | Park | 257/59 |
| 6,486,933 B1 | 11/2002 | Cha et al. | |
| 6,628,368 B2 | 9/2003 | Yang | |
| 6,809,335 B2 * | 10/2004 | Park | 257/59 |
| 6,940,573 B2 | 9/2005 | Um et al. | |
| 6,969,872 B2 | 11/2005 | Kim | |
| 7,019,805 B2 | 3/2006 | Kim et al. | |
| 7,019,806 B2 | 3/2006 | Um et al. | |
| 7,061,562 B2 | 6/2006 | Kim et al. | |
| 7,079,210 B2 | 7/2006 | Um et al. | |
| 7,113,159 B2 * | 9/2006 | Sawabe | 345/89 |
| 7,227,605 B2 | 6/2007 | Kim et al. | |
| 7,365,825 B2 | 4/2008 | Kim | |
| 7,916,244 B2 * | 3/2011 | Hur et al. | 349/106 |
| 2009/0027325 A1 * | 1/2009 | Kim et al. | 345/92 |

FOREIGN PATENT DOCUMENTS

| | | |
|---|---|---|
| TW | 569168 | 1/2004 |
| TW | 200739222 | 10/2007 |

* cited by examiner

*Primary Examiner* — Mike Qi
(74) *Attorney, Agent, or Firm* — Winston Hsu; Scott Margo

(57) ABSTRACT

A flat display panel includes a plurality of bridge lines disposed between adjacent common lines. When a short defect occurs, the common line near the short defect can be directly cut off in order to repair the short defect and the common voltage can be transferred through the bridge lines to maintain the normal operation of the flat display panel.

32 Claims, 6 Drawing Sheets

FLAT DISPLAY PANEL AND METHOD OF REPAIRING CONDUCTIVE LINES THEREOF

BACKGROUND OF THE INVENTION

1. Field of the Invention

The present is related to a flat display panel and a method of repairing conductive lines thereof and more particularly, to a flat display panel and a method of repairing conductive lines of the flat display panel without using rescue lines.

2. Description of the Prior Art

Compared with traditional non-flat display panels, such as cathode ray tube display, flat display panels has been a mainstream product in the market because of having the characteristics of lightweight and thin thickness, and is widely applied to household televisions, monitors of personal computers, and mobile electronic products such as mobile phones, digital cameras, and mobile music-players.

Since the design of flat displays tends to provide high resolution, the density of conductive lines such as scan lines and data lines of one flat display panel becomes higher and higher. Accordingly, the difficulty of fabrication process of the flat display panel is comparatively raised so that short defect easily occurs between adjacent conductive lines. In addition, taking the liquid crystal display (LCD) panel as an example, the designs of 2D1G and 2G1D structures have been introduced into the design of LCD panels in order to practice multi-domain vertical alignment (MVA) design for increasing the range of viewing angles, wherein the 2D1G structure means each pixel region has two data lines and one scan line (or called gate line), and the 2G1D structure means each single pixel region has one data line and two scan lines. In a 2D1G structure, for instance, one pixel region may includes two sub-pixels that are respectively controlled by two different data lines, and therefore there are two data lines arranged next to each other between two adjacent pixel regions such that the distance between adjacent data lines is substantially reduced, which also easily causes short defects.

According to the conventional repairing method of conductive lines of flat display panels, an additional rescue line has to be disposed on the substrate, and the conventional repairing method includes cutting off the part of conductive lines with the short defect and connecting the cut lines by an additional rescue line so as to transfer signals to provide a normal operation. However, according to the design of conductive line arrangement of traditional LCDs, using a laser blade to cut off the data lines with short defect easily cause a new H-line or cross-short problem in a large area, which means the cut data line and other material layers overlapping and positioned below or above the cut data line, such as capacitance electrode or common electrode line, may melt at the same time and be connected with each other, because of bad energy control of laser blade. In addition, the traditional repairing method by using the rescue line makes signals be transferred through an additional conducting path, which influences in the operation efficiency of the flat display panel. For example, a flat display panel with a scanning frequency of about 120 hertz which has been repaired with rescue lines will have operation and performance problems and the repairing effect will not be good enough. Therefore, to provide a simple repairing method of conductive lines and corresponding structure design of flat display panels are still important issues for the manufacturers of flat display panels.

SUMMARY OF THE INVENTION

It is an objective of the present invention to provide a flat display panel and a method of repairing conductive lines thereof, wherein the flat display panel of the present invention comprises a plurality of bridge lines disposed between adjacent common electrode lines. Accordingly, the bridge lines replace traditional rescue lines for repairing the conductive lines having short defects, and further solving the above-mentioned problem of bad operation performance of conventional flat display panels caused by using rescue lines to repair short defects.

According to the present invention, a flat display panel is provided. The flat display panel comprises a substrate, a first downside sub-pixel, a second downside sub-pixel, a third upside sub-pixel, and a fourth upside sub-pixel. The substrate has at least a first pixel region, a second pixel region, a third pixel region, and a fourth pixel region arranged as an array defined thereon. The first pixel region and the second pixel region are arranged along a horizontal direction, the third pixel region and the fourth pixel region are disposed on an underside of the first pixel region and the second pixel region respectively and next to the first pixel region and the second pixel region respectively. The first downside sub-pixel, the second downside sub-pixel, the third upside sub-pixel, and the fourth upside sub-pixel are respectively in the first pixel region, the second pixel region, the third pixel region, and the fourth pixel region. The flat display panel of the present invention further comprises: a first data line and a second data line disposed on the substrate and aligned along a vertical direction, wherein the first and second data lines are positioned at two sides of the first pixel region and the third pixel region respectively; a third data line and a fourth data line aligned along the vertical direction on the substrate and positioned at two sides of the second pixel region and the fourth pixel region respectively, wherein the second data line and the third data line are positioned between the first pixel region and the second pixel region; a first scan line and a second scan line expanding along the horizontal direction on the substrate and passing through the first and the second pixel regions and the third and the fourth pixel regions respectively; a first common electrode line expanding along the horizontal direction and passing through the first and the second pixel regions; a second common electrode line expanding along the horizontal direction and passing through the third and the fourth pixel regions; a first bridge line disposed between the first common electrode line in the first pixel region and the second common electrode line in the third pixel region and electrically connected to the first and the second common electrode lines; and a second bridge line disposed between the first common electrode line in the second pixel region and the second common electrode line in the fourth pixel region and electrically connected to the first and the second common electrode line.

According to the present invention, a flat display panel is further provided. The flat display panel comprises a substrate, a first upside sub-pixel, a first downside sub-pixel, a second upside sub-pixel, and a second downside sub-pixel, wherein at least a first pixel region and a second pixel region arranged as an array are defined on the substrate, and the second pixel region is disposed on an underside of the first pixel region and next to the first pixel region. The first upside sub-pixel and the first downside sub-pixel are disposed in the first pixel region, and the second upside sub-pixel and the second downside sub-pixel are disposed in the second pixel region. The first upside sub-pixel, the first downside sub-pixel, the second upside sub-pixel, and the second downside sub-pixel are arranged along a vertical direction in order. The flat display panel of the present invention further comprises: a first data line and a second data line arranged along a vertical direction and disposed at two sides of the first pixel region and the second pixel region respectively, wherein the first data line is used for providing input signals to the first and the second upside sub-pixels, and the second data line is used for providing input signals to the first and the second downside sub-pixels; a first scan line and a second scan line extending along the horizontal direction and passing through the first and the second pixel regions respectively; a first common electrode line extending along the horizontal direction and passing through the first downside sub-pixel; a second common electrode line expending along the horizontal direction and passing through the second upside sub-pixel; and a bridge line disposed between the first and the second common electrode lines and electrically connected to the first and the second common electrode lines.

According to the present invention, a method of repairing conductive lines of flat display panels is even further provided. The method is applied to a flat display panel that comprises: a substrate with a first pixel region, a second pixel region, a third pixel region, and a fourth pixel region arranged as an array and defined thereon, wherein the first pixel region and the second pixel region are arranged along a horizontal direction, and the third pixel region and the fourth pixel region are disposed on an underside of the first pixel region and the second pixel region and adjacent to the first pixel region and the second pixel region respectively; a first downside sub-pixel, a second downside sub-pixel, a third upside sub-pixel, and a fourth upside sub-pixel disposed in the first pixel region, the second pixel region, the third pixel region, and the fourth pixel region respectively; at least two scan lines expending along the horizontal direction on the substrate and passing through the first and the second pixel regions and the third and the fourth pixel regions respectively; a first common electrode line expending along the horizontal direction and passing through the first and the second downside sub-pixels; a second common electrode line expending along the horizontal direction and passing through the third and the fourth upside sub-pixels; a first data line and a second data line disposed on the substrate and arranged along a vertical direction, wherein the first and second data lines are positioned at two sides of the first and the third pixel regions respectively, and the second data line crosses the first common electrode line and the second common electrode line at a first crossing point and a second crossing point respectively; a third data line and a fourth data line disposed on the substrate and arranged along the vertical direction, wherein the third data line and the fourth data line are positioned at two sides of the second and the fourth pixel regions respectively, and the third data line crosses the first common electrode line and the second common electrode line at a third crossing point and a fourth crossing point respectively; a first bridge line positioned between the first and the second common electrode lines and electrically connected to the first and the second common electrode lines; and a second bridge line positioned between the first and the second common electrode lines and electrically connected to the first and the second common electrode lines. The method of repairing conductive lines of the flat display panel according to the present invention comprises: when a short defect of the second data line and the third data line occurs near the first crossing point or the third crossing point, using a laser blade to cut off the portion of the second data line and the third data line with the short defect along the vertical direction and cut off the first common electrode line at two sides of the first and the third crossing points along the vertical direction; and when a short defect of the second data line and the third data line occurs near the second crossing point or the fourth crossing point, using the laser blade to cut off the portion of the second data line and the third data line with the short defect along the vertical direction and cut off the first common electrode line at two sides of the second crossing point and the fourth crossing point along the vertical direction.

It is an advantage that the flat display panel of the present invention comprises a plurality of bridge lines disposed between adjacent common electrode lines such that the common electrode line near the short defect can be directly cut off and the bridge line can be used for transferring common voltage in order to effectively improve the operation performance and efficiency of the flat display panel, wherein no additional rescue line is needed for repairing the conductive lines.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
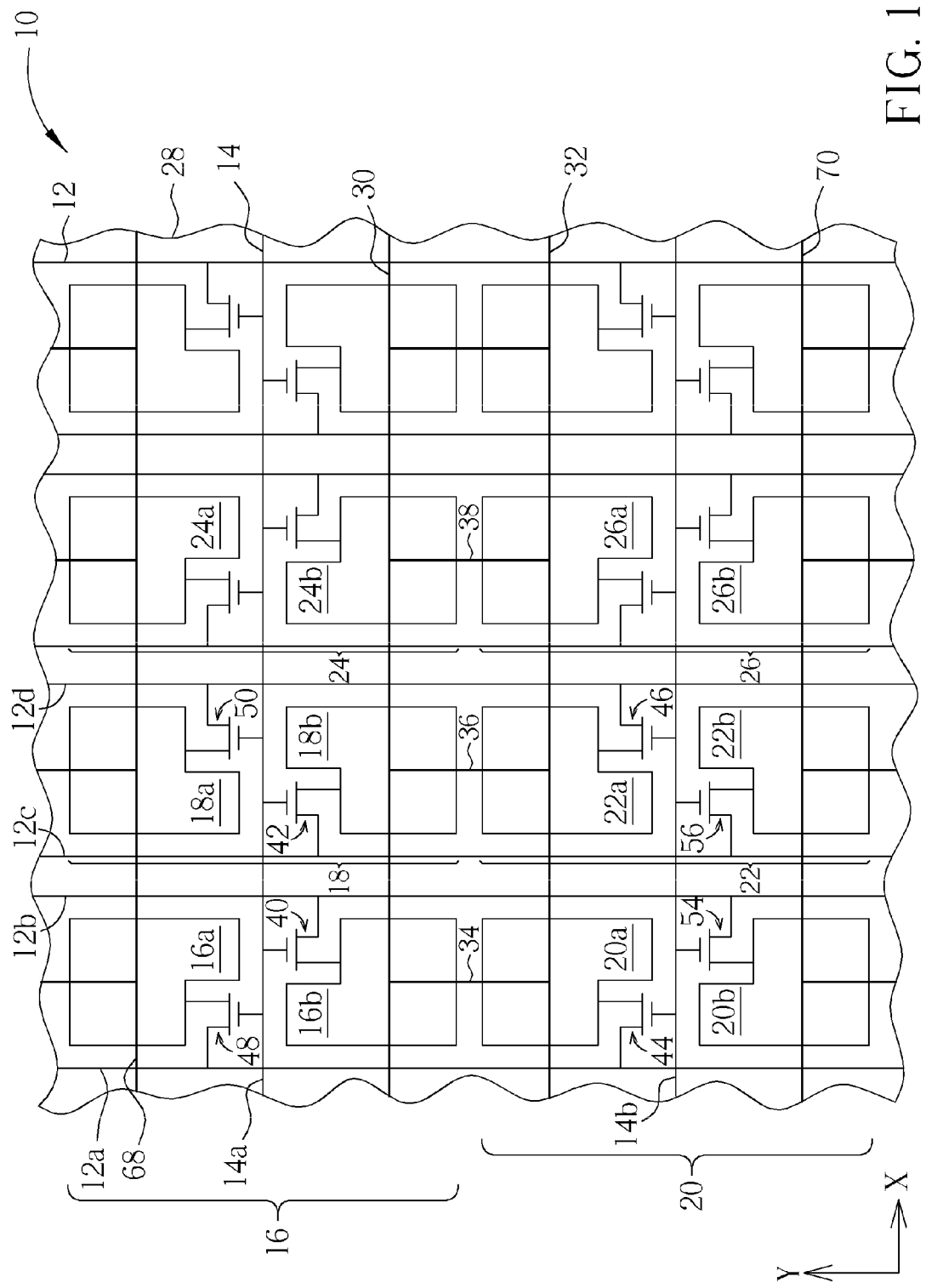
FIG. 1 is an equivalent circuit schematic diagram of the pixel regions of a flat display panel according to the present invention.

With reference to FIG. 1, FIG. 1 is an equivalent circuit schematic diagram of pixel regions of a flat display panel according to the present invention. Wherein, only a part of the flat display panel is illustrated in FIG. 1. In this embodiment, the flat display panel 10 of the present invention is a polymer stabilized alignment (PSA) LCD panel, comprising at least a substrate 28. A plurality of scan lines 14 and a plurality of data lines 12 are disposed on the substrate 28, arranged along a horizontal direction (as the direction X shown in the figure) and a vertical direction (as the direction Y shown in the figure) respectively. Therefore, the scan lines 14 and the data lines 12 defines a plurality of pixel regions arranged as an array on the substrate 28, such as the first pixel region 16, the second pixel region 18, the third pixel region 20, the fourth pixel region 22, the fifth pixel region 24, and the sixth pixel region 26 in FIG. 1. The first pixel region 16, the second pixel region 18, and the fifth pixel region 24 are arranged along direction X, and the third pixel region 20, the fourth pixel region 22, and the sixth pixel region 26 are positioned on the underside of the first pixel region 16, the second pixel region 18, and the fifth pixel region 24 and adjacent to the first pixel region 16, the second pixel region 18, and the fifth pixel region 24 respectively. In addition, each pixel region comprises two sub-pixels. For example, the first pixel region 16 comprises a first upside sub-pixel 16a and a first downside sub-pixel 16b, the second pixel region 18 comprises a second upside sub-pixel 18a and a second downside sub-pixel 18b, the third pixel region 20 comprises a first upside sub-pixel 20a and a second downside sub-pixel 20b, and so on. Therefore, the first upside sub-pixel 16a, the first downside sub-pixel 16b, the third upside sub-pixel 20a, and the third downside sub-pixel 20b are arranged in a line along direction Y, adjacent to each other in sequence.

Since each pixel region includes two sub-pixels, every pixel region is driven by two data lines 12 and one scan line 14, which means the flat display panel 10 has a 2D1G structure with two data line and one scan line. For instance, the first upside sub-pixel 16a is controlled by the first data line 12a at its left side and the first scan line 14a at its underside, and the first downside sub-pixel 16b is controlled by the second data line 12b at its right side and the first scan line 14a. As a result, the upside sub-pixel and the downside sub-pixel in the same pixel region are controlled by the same scan line 14a, the upside sub-pixels of each pixel region positioned in the same column are electrically connected to the same data line 12, and the downside sub-pixels of each pixel region positioned in the same column are electrically connected to another same data line 12. For example, the first and the third upside sub-pixels 16a, 20a are both electrically connected to the first data line 12a at their left side, and the first and the third downside sub-pixels 16b, 20b are both electrically connected to the second data line 12b at their right side, which means the first data line 12a is used for providing input signals to the first and the third upside sub-pixels 16a, 20a while the second data line 12b is used for providing input signals to the first and the third downside sub-pixels 16b, 20b. Similarly, the third data line 12c and the fourth data line 12d are respectively positioned at the left and right sides of the second pixel region 18 and the fourth pixel region 22, electrically connected to the second and the fourth downside sub-pixels 18b, 22b and the second and the fourth upside sub-pixels 18a, 22a. Under this design, the second data line 12b and the third data line 12c are disposed next to each other and between the first pixel region 16 and the second pixel region 18. It should be noted that the first downside sub-pixel 16b is electrically connected to the second data line 12b through the first transistor 40, the second downside sub-pixel 18b is electrically connected to the third data line 12c through the second transistor 42, the third upside sub-pixel 20a is electrically connected to the first data line 12a at its left side through the third transistor 44, and the fourth upside sub-pixel 22a is electrically connected to the fourth data line 12d at its right side through the fourth transistor 46. Therefore, the elements of the pixel regions in the two adjacent columns have opposite arrangements, which means the element arrangement of the first pixel region 16 and the third pixel region 20 in the same column and the element arrangement of the second pixel region 18 and the fourth pixel region 22 in the another adjacent column have mirror symmetry. However, the element arrangement of each pixel region of the present invention flat display panel 10 is not limited to the illustration shown in FIG. 1. For instance, in other embodiments, the element arrangements of pixel regions in two adjacent columns may be completely the same. In further other embodiments, the upside sub-pixels of pixel regions may be all electrically connected to data lines at their right side while the downside sub-pixels may be all electrically connected to the data lines at their left side.

Figure 2:
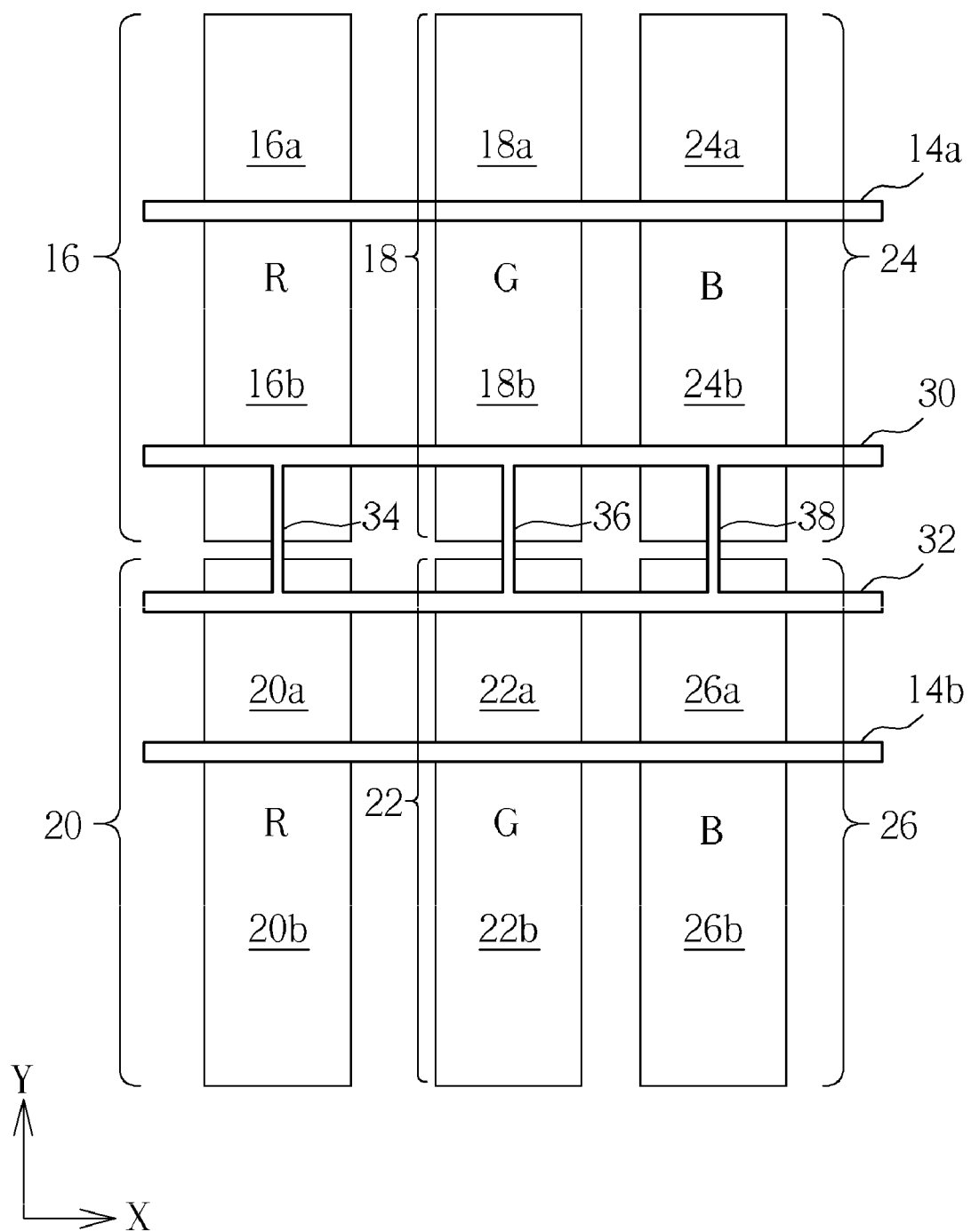
FIG. 2 is a schematic diagram of the arrangement of the conductive lines of the flat display panel shown in FIG. 1.

As referring to FIG. 2, FIG. 2 is schematic diagram of an arrangement of partial conductive lines of the flat display panel 10 shown in FIG. 1. The pixel regions positioned in the same row represent the pixels (or sub-pixels) providing the same color light. For example, the first and the third pixel regions 16, 20 represent red pixels; the second and the fourth pixel regions 18, 22 represent green pixels; and the fifth and the sixth pixel regions 24, 26 represent blue pixels. The flat display panel 10 further comprises a plurality of common electrode lines parallel to each other on the substrate 28, wherein FIG. 2 only shows the first common electrode line 30 and the second common electrode line 32 for illustrating. The first common electrode line 30 extends along direction X, passing through the first, the second, and the fifth pixel regions 16, 18, 24 and the second common electrode line 32 pass through the third, the fourth, and the sixth pixel regions 20, 22, 26. The first and second common electrode lines 30, 32 are used to provide a common voltage Vcom to corresponding pixel regions when the flat display panel 10 is under operation.

In addition, the flat display panel 10 further comprises a plurality of bridge lines arranged along direction Y and in parallel with each other, such as the first bridge line 34, the second bridge line 36, and the third bridge line 38, electrically connected to the first and the second common electrode lines 30, 32. The first bridge line 34 is positioned between the first and the second common electrode lines 30, 32 in the first and the third pixel regions 16, 20, the second bridge line 36 is positioned between the first and the second common electrode lines 30, 32 in the second and the fourth pixel regions 18, 22, and so on. Accordingly, the first and the second common electrode lines 30, 32, the first bridge line 34, the second bridge line 36, and the third bridge line 38 are electrically connected to each other. In a preferable embodiment, the first bridge line 34, the second bridge line 36, the third bridge line 38, the first common electrode line 30, and the second common electrode line 32 are composed of the same patterned conductive layer. It should be noted that the flat display panel 10 further comprises other common electrode lines 68, 70 and bridges lines (only shown in FIG. 1) connected to the common electrode lines 68, 70 that extend through the first, the second, and the fifth upside sub-pixels 16a, 18a, 24a and the third, the fourth, and the sixth downside sub-pixels 20b, 22b, 26b respectively.

Figure 3:
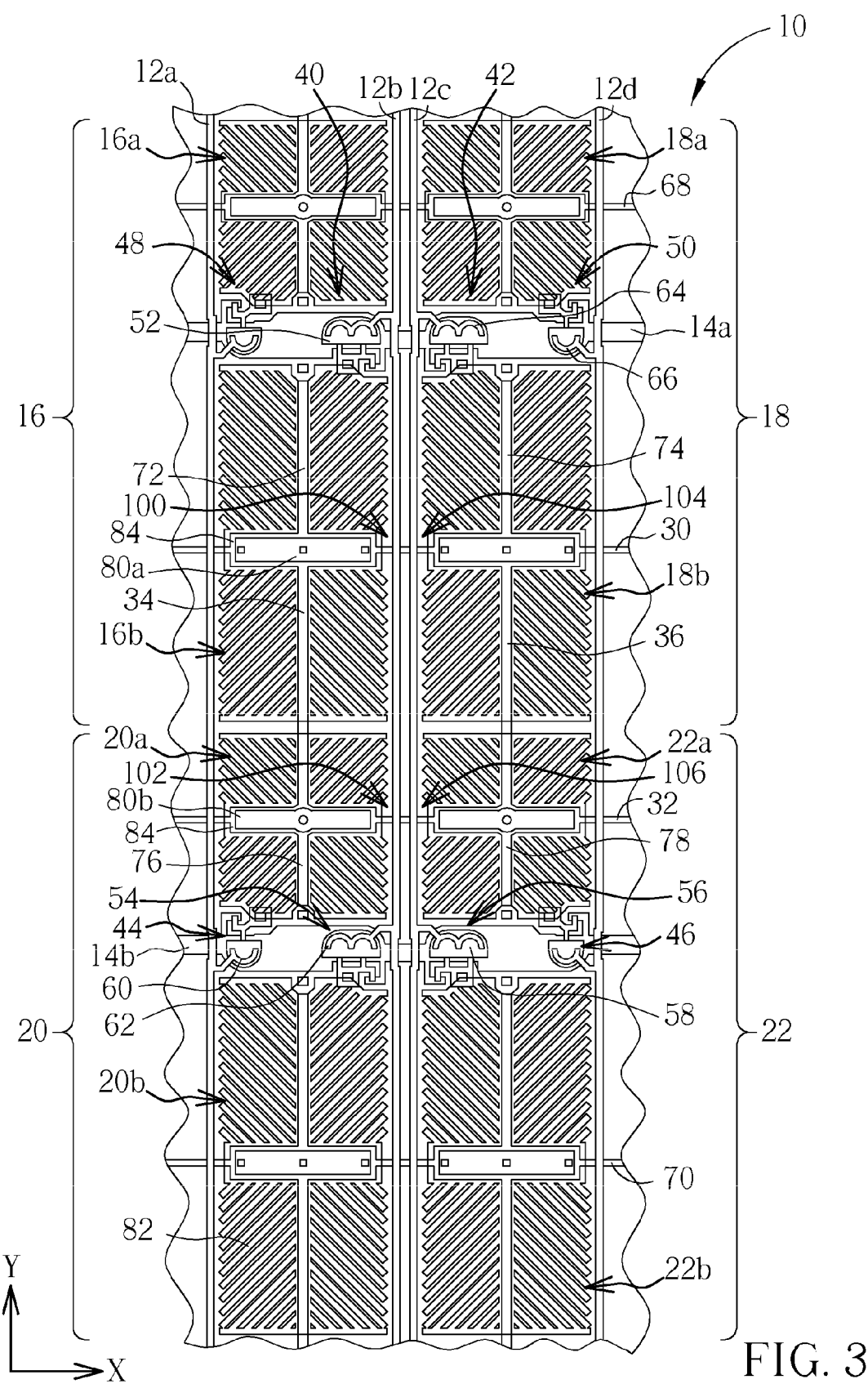
FIG. 3 is a schematic diagram of the arrangement of the pixel elements of the flat display panel shown in FIG. 1.

Referring to FIG. 3, FIG. 3 is a schematic diagram of the layout of the flat display panel 10 shown in FIG. 1. The first scan line 14a and the second scan line 14b extend along direction X and respectively pass through the first and the second pixel regions 16, 18 and the third and the fourth pixel regions 20, 22. Therefore, the first scan line 14a and the second scan line 14b divide the first, the second, the third, and the fourth pixel regions 16, 18, 20, 22 into the first, the second, the third, and the fourth upside sub-pixel 16a, 18a, 20a, 22a with smaller areas and the first, the second, the third, and the fourth downside sub-pixels 16b, 18b, 20b, 22b with larger areas. Accordingly, the first scan line 14a is positioned between the first upside sub-pixel 16a and the first downside sub-pixel 16b, and the second scan line 14b is positioned between the third upside sub-pixel 20a and the third downside sub-pixel 20b. In addition, the first scan line 14a is electrically connected to the gates 52 of the first transistor 40, the second transistor 42, and the transistors 48, 50, and the second scan line 14b is electrically connected to the gates 58 of the third transistor 44, the fourth transistor 46, and the transistors 54, 56. In preferable embodiments, the transistor of each pixel region, such as the first transistor 40 or the second transistor 42, may be a thin film transistor, and the first scan line 14a, the second scan line 14b, and the gates 52, 58 may be formed with the same patterned conductive layer, such as comprising a first metal material layer. The first, the second, the third, and the fourth data lines 12a, 12b, 12c, 12d are arranged along direction Y, perpendicular to and above the first scan line 14a and the second scan line 14b, and may comprise a second metal material layer. The first data line 12a is electrically connected to the sources 60 of the third transistor 44 and the transistor 48; the second data line 12b is electrically connected to the sources 62 of the first transistor 40 and the transistor 54; the third data line 12c is electrically connected to the sources 64 of the second transistor 42 and the transistor 56; and the fourth data line 12d is electrically connected to the sources 66 of the fourth transistor 46 and the transistor 50.

On the other hand, the first common electrode line 30 and the common electrode line 68, the second common electrode line 32 and the common electrode line 70 are substantially parallel to the first and the second scan lines 14a, 14b, passing through the first and the second downside sub-pixels 16b, 18b, the first and the second upside sub-pixels 16a, 18a, the third and the fourth upside sub-pixels 20a, 22a, and the third and the fourth downside sub-pixels 20b, 22b respectively, wherein the first and the second common electrode lines 30, 32 are disposed between the adjacent first and second scan lines 14a, 14b. The second data line 12b crosses the first and the second common electrode lines 30, 32 at the first crossing point 100 and the second crossing point 102 respectively, and the third data line 12c crosses the first and the second common electrode lines 30, 32 at the third crossing point 104 and the fourth crossing point 106 respectively. The portions of the first common electrode line 30 and the second common electrode line 32 positioned in the first, the second, the third, and the fourth pixel region 16, 18, 20, 22 are respectively defined as a common electrode 84, which has a larger area or is wider than the other portions of the first and the second common electrode lines 30, 32. The first and the second bridge lines 34, 36 are connected to and between the adjacent common electrodes 84. Moreover, the flat display panel 10 further comprises at least two first common electrode branches 72, 74 and at least two second common electrode branches 76, 78 arranged along direction Y, wherein the first common electrode branches 72, 74 are disposed inside the first and the second downside sub-pixels 16b, 18b, at the sides of the first common electrode line 30 opposite to the first and the second bridge lines 34, 36. In addition, the first common electrode branches 72, 74 are respectively connected to the first and the second bridge lines 34, 36 with the corresponding common electrodes 84 of the first common electrode line 30. In another aspect, the second common electrode branches 76, 78 are respectively disposed in the third and the fourth upside sub-pixels 20a, 22a and positioned at the side of the second common electrode line 32 opposite to the first and the second bridge lines 34, 36, and are connected to the first and the second bridge lines 34, 36 with the corresponding common electrodes 84 of the second common electrode line 32. Accordingly, the first common electrode line 30 (or the common electrode 84), the first common electrode line branch 72, and a portion of the first bridge line 34 are connected with each other and form a cross shape pattern (such as the shape of "+"), inside the first downside sub-pixel 16b. Similarly, the second common electrode line 32 (or the common electrode 84), the second common electrode line branch 78, and a portion of the second bridge line 36 are also connected to each other and arranged with a cross shape pattern, inside the fourth upside sub-pixel 22a. In a preferable embodiment, the first bridge line 34, the second bridge line 36, the first common electrode line 30, the second common electrode line 32, the first common electrode branches 72, 74, the second common electrode branches 76, 78, the gates 52, 58 of each transistor (such as the first transistor 40), and the first and the second scan lines 14a, 14b are all formed with a same patterned conductive layer, such as the first metal materially layer mentioned above.

In addition, the flat display panel 10 further comprises a plurality of metal electrodes 80a, 80b positioned at least in the first and the second downside sub-pixels 16b, 18b and in the third and the fourth upside sub-pixels 20a, 22a. The metal electrodes 80a and 80b cover portions of the first common electrode line 30 and the second common electrode line 32 respectively and may comprise a third metal material layer, serving as a storage capacitance electrode of each sub-pixel. It should be noted that the portions of the first common electrode line 30 and the second common electrode line 32 overlapped by the metal electrodes 80a, 80b are respectively defined as the above-mentioned common electrodes 84. The shapes of the metal electrodes 80a, 80b are approximately the same as or similar to the shapes of their corresponding common electrodes 84, and each common electrode 84 may form a parasitic capacitance with the corresponding metal electrodes 80a, 80b respectively. Each sub-pixel further comprises a transparent electrode 82 disposed above the metal electrodes 80a, 80b, and the transparent electrodes 82 are electrically connected to the corresponding metal electrodes 80a, 80b. The transparent electrode 82 of each sub-pixel serves as the pixel electrode, covering the surface of the sub-pixel, wherein each transparent electrode 82 has a special pattern used for limiting the inverting directions of liquid crystal (LC) molecules. In addition, except for the interval parts of adjacent transparent electrodes 82 on the substrate 28, the first and the second common electrode lines 30, 32 and the first and the second bridge lines 34, 36 are all covered by the corresponding transparent electrodes 82.

Figure 4:
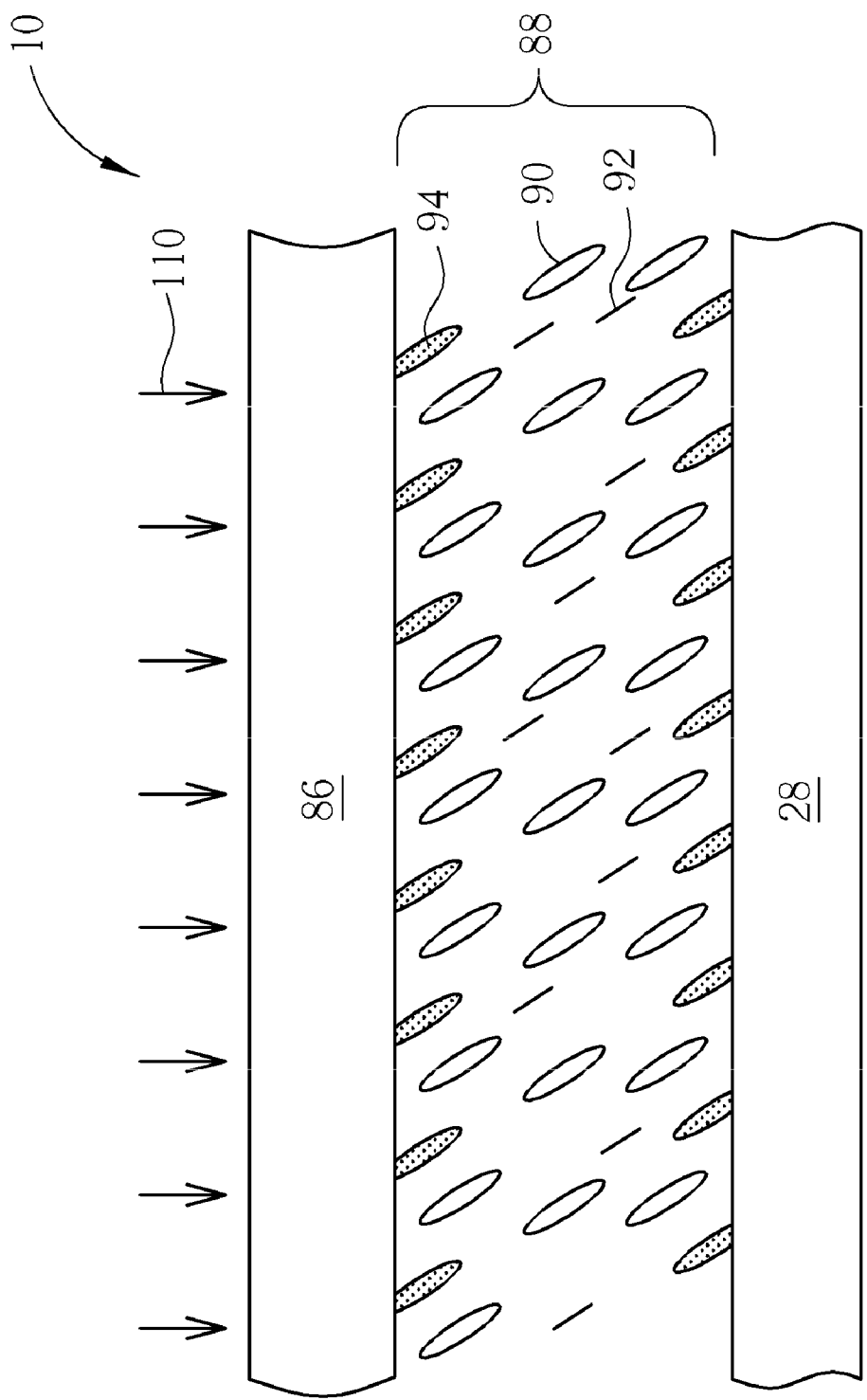
FIG. 4 is a schematic diagram of the partial sectional-view of a flat display panel according to the present invention.

With reference to FIG. 4, FIG. 4 is a partial sectional diagram of the flat display panel 10 of the present invention. Since the present invention flat display panel 10 is a PSA LCD panel, the substrate 28 with thin film elements will be combined with a color filter (CF) substrate 86 during the fabrication process, and the LC layer 88 will be filled between the substrate 28 and the CF substrate 86, wherein the LC layer 88 includes LC molecules 90 and reactive monomers 92. Then, a PSA process will be performed. In the PSA process, a voltage is applied onto the CF substrate 86 and the substrate 28 to make the LC molecules 90 have a predetermined angle, and an energy light 110 is provided to illuminate or heat the flat display panel 10 such that the reactive monomers 92 are polymerized along the predetermined angle of the LC molecules 90 to form polymers 94 on the surfaces of the CF substrate 86 and the substrate 28. After the voltage is removed, the LC molecules 90 will have a pre-tilt angle along the arrangement direction of the polymers 94. In addition, the transparent electrodes 82 shown in FIG. 3 with special pattern design further effectively improve the aligning arrangement of the LC molecules 90. However, extra alignment films may also be disposed on the inner surfaces of the CF substrate 86 and the substrate 28 to even further assist LC molecules 90 in alignment.

Figure 5:
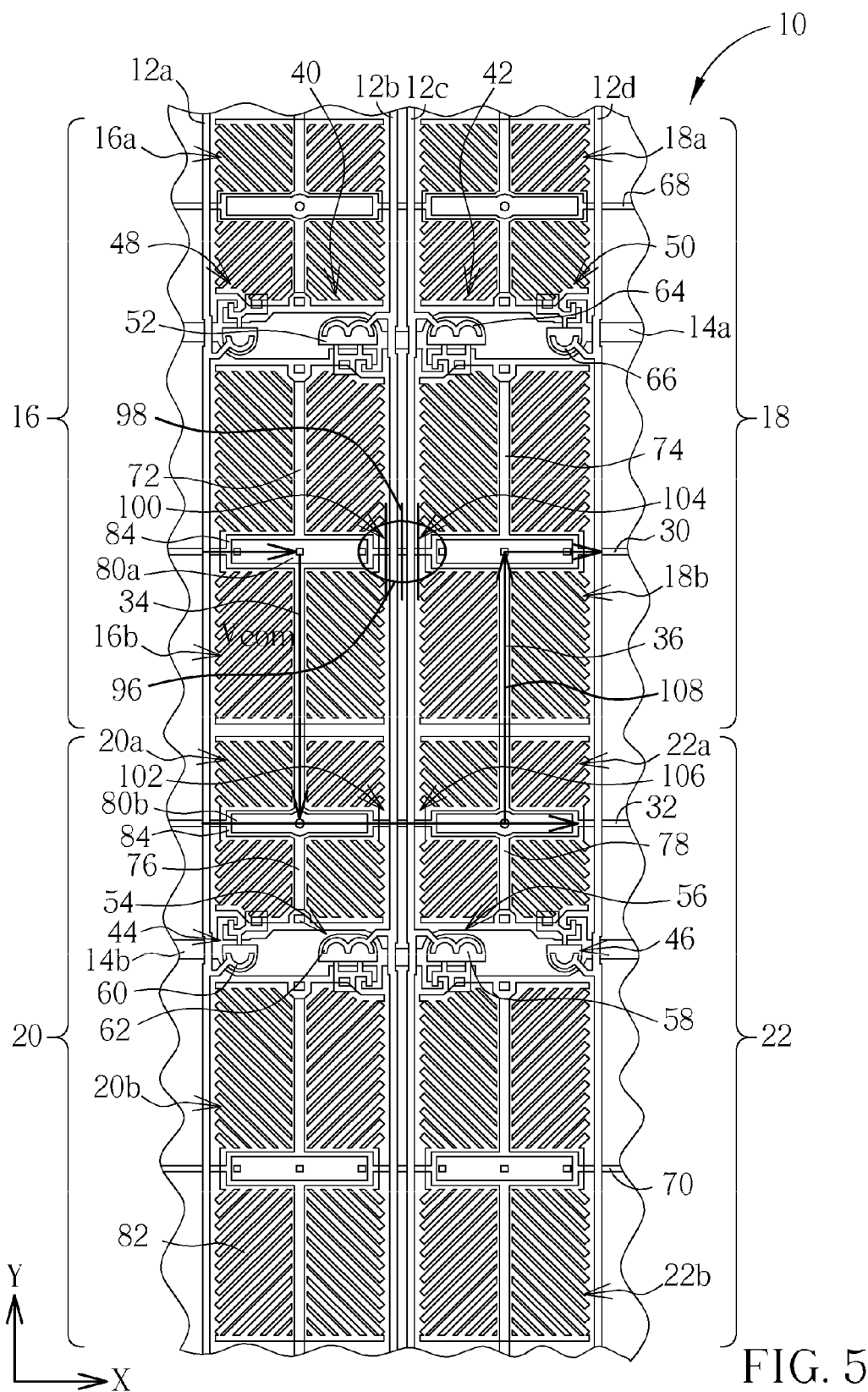
FIG. 5 is a schematic diagram of repairing conductive lines of a flat display panel according to the present invention.
Figure 6:
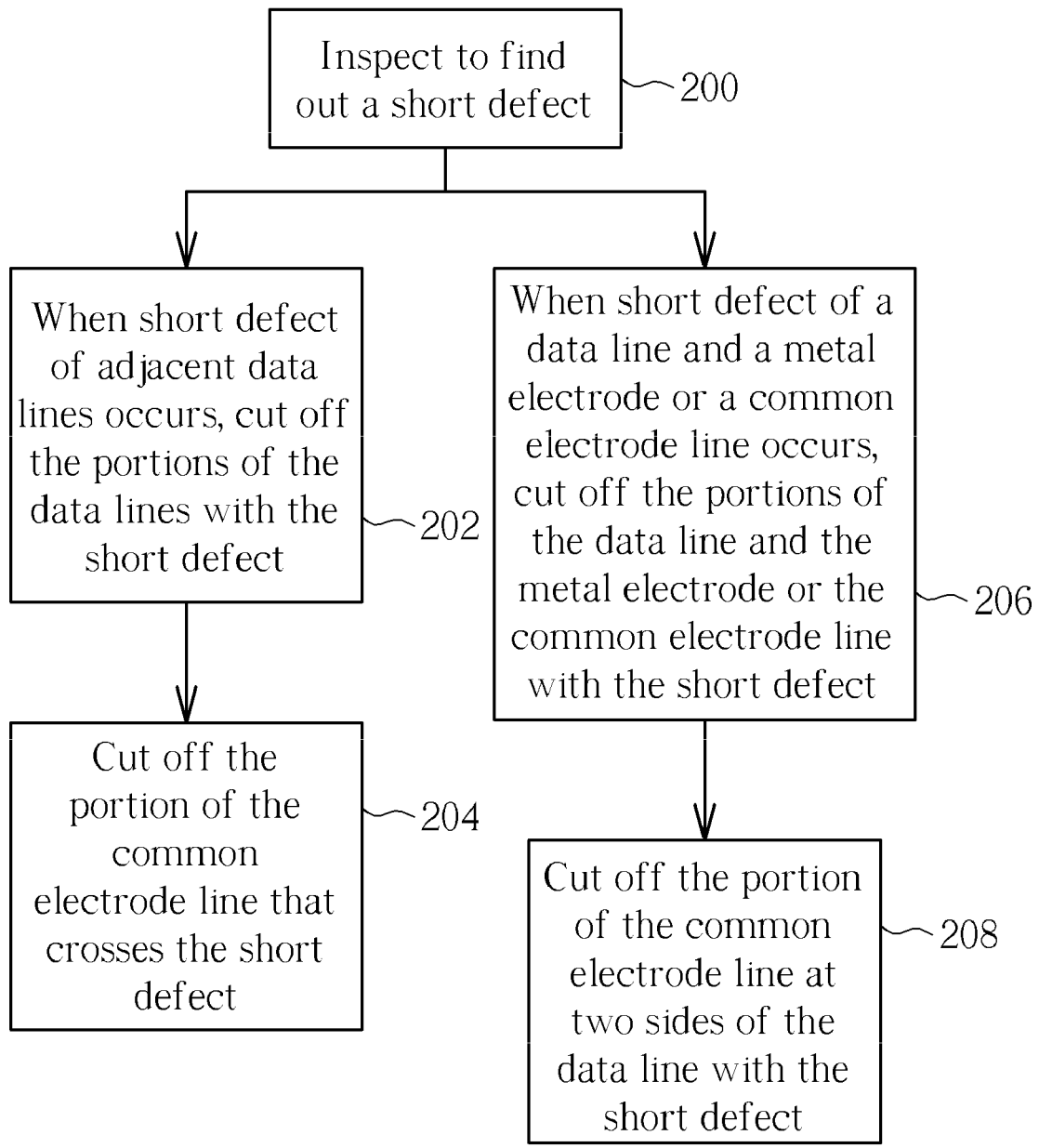
FIG. 6 is a process flow diagram of the method of repairing conductive lines according to the present invention.

As mentioned above, since the present invention flat display panel 10 comprises the first and the second bridge lines 34, 36, an effective repairing method of conductive lines can be provided. Referring to FIGS. 5-6, FIG. 5 is a schematic diagram of repairing conductive lines of the flat display panel 10 according to the present invention, and FIG. 6 is a process flow diagram of repairing method of conductive lines of the present invention. Under the design of 2D1G structure, the adjacent second data line 12b and the third data line 12c have very tiny interval space therebetween. Accordingly, it is unavoidable that a short defect may occur resulted from the connection between the second and third data lines 12b, 12c during the fabrication process, such as the short portion 96 noted by a circle mark. Alternatively, other indefinite factors may cause the second data line 12b and the third data line 12c have short or various defects at the first and the second crossing points 100, 102 and the third and the fourth crossing points 104, 106 with other conductive lines respectively. For instance, it is possible that the second data line 12b may have the short defect with the metal electrode 80*a* or the first common electrode line 30 at the first crossing point 100. When a short defect of conductive lines occurs, the following repairing method of conductive lines according to the present invention may be performed:

Step 200: During inspecting the defects of a panel, if a short defect is found out, the repairing method of conductive lines of the present invention with step 202 to step 208 may be performed in order to repair the short defect;

Step 202: If the short defect occurs between two adjacent data lines, use a laser blade to cut off the portions of the data lines with the short defect along direction Y (vertical direction);

Step 204: Use the laser blade to cut off the portion of the common electrode line that crosses the short defect along direction Y such that the common electrode line at the left and right sides of the short defect is disconnected;

Step 206: If the short defect occurs between one data line and its adjacent metal electrode or common electrode line, use the laser blade to cut off the portions of the data line and the metal electrode or the common electrode line with the short defect along direction Y; and Step 208: Use the laser blade to cut off a portion of the common electrode line that crosses the data line with the short defect such that the common electrode line at the left and right sides of the data line with the short defect is disconnected.

Wherein, the performing procedure or sequence of step 202 to step 206 of the present invention repairing method is not substantially limited. For instance, in step 202 and step 204, when a short defect of the second data line 12*b* and the third data line 12*c* occurs at the first or the third crossing points 100, 104, the laser blade is used to cut off the portions of the second data line 12*b* and the third data line 12*c* with the short defect and the first common electrode line 30 at two sides of the first and the third crossing points 100, 104 along direction Y, wherein the cutting line 98 of the laser blade is shown in FIG. 5. Under this situation, although the first common electrode line 30 at two sides of the second and the third data lines 12*b*, 12*c* is disconnected, the transferring path of the common voltage Vcom is slightly changed, which is transferred through the first bridge line 34 downward to the second common electrode line 32 and through the second bridge line 36 upward to the first common electrode line 30, wherein the transferring path and direction are shown by the arrow 108 in FIG. 5. Accordingly, the operation performance of the flat display panel 10 will not be influenced because the transferring path of the common voltage is not obviously changed. Alternatively, when the short defect of the second data line 12*b* and the third data line 12*c* occurs at the second crossing point 102 or the fourth crossing point 106, the laser blade may be used to cut off the portions of the second data line 12*b* and the third data line 12*c* with the short defect and the second common electrode line 32 at two sides of the second and the fourth crossing points 102, 106 along direction Y, wherein the cutting line may be similar to the cutting line 93 to vertically cut the two sides of the crossing points of the second and the third data lines 12*b*, 12*c* and the second common electrode line 32.

In another aspect, the explanation of steps 206, 208 are illustrated as the following description. To give an example, when the short defect of the second data line 12*b* and the metal electrode 80*a* or the first common electrode line 30 occurs near the first crossing point 100, the laser blade is used to cut off the portions of the second data line 12*b* and the metal electrode 80*a* or the first common electrode line 30 with the short defect and the first common electrode line 30 at the left and right sides of the third crossing point 104 along direction Y, wherein the cutting line 98 of the laser blade is shown in FIG. 5; when the short defect of the second data line 12*b* and the metal electrode 80*b* or the second common electrode line 32 occurs near the second crossing point 102, the laser blade is used to cut off the portions of the second data line 12*b* and the metal electrode 80*b* with the short defect and the second common electrode line 32 at two sides of the fourth crossing point 106 along direction Y; when the short defect of the third data line 12*c* and the metal electrodes 80*a* or the first common electrode line 30 occurs near the third crossing point 104, the laser blade is used to cut off the portions of the third data line 12*c* and the metal electrodes 80*a* with the short defect and the first common electrode line 30 at two sides of the first crossing point 100 along direction Y, such as the cutting line 98; and when the short defect of the third data line 12*c* and the metal electrode 80*b* or the second common electrode line 32 occurs near the fourth crossing point 106, the laser blade may be used to cut off the portions of the third data line 12*c* and the metal electrodes 80*b* with the short defect and the second common electrode line 32 at two sides of the second crossing point 102.

In contrast to the prior art, the flat display panel with bridge lines and the repairing method of conductive lines of the present invention are not limited to LCD panel applications, and may be applied to other flat display panels with thin-film conductive patterns such as organic light emitting display panels or plasma display panels. The present invention flat display panel includes a plurality of bridge lines that are connected to adjacent common electrode lines. Therefore, when a short defect occurs between data lines or between a data line and its adjacent common electrode line or other metal electrode, the common electrode lines near the short defect can be directly and vertically cut off to slightly change the transferring path of the common voltage for repairing the short defect. Accordingly, the overlapped various material layers, such as the data line, the common electrode line, or the metal electrode, will not form new defects during the cutting process performed through a laser blade. As a result, according to the design structure of the flat display panel and repairing method of conductive lines of the present invention, the repairing process can be finished through simple steps to effectively improve the fabrication yield and operation performance of the flat display panel, wherein no additional rescue line is needed to be further fabricated.

Those skilled in the art will readily observe that numerous modifications and alterations of the device and method may be made while retaining the teachings of the invention.

What is claimed is:

1. A flat display panel, comprising:
    a substrate, a first pixel region, a second pixel region, a third pixel region, and a fourth pixel region arranged as an array being defined on the substrate, the first pixel region and the second pixel region being arranged along a horizontal direction, the third pixel region and the fourth pixel region are respectively disposed on an underside of the first pixel region and the second pixel region and adjacent to the first pixel region and the second pixel region;
    a first downside sub-pixel, a second downside sub-pixel, a third upside sub-pixel, and a fourth upside sub-pixel respectively positioned in the first pixel region, the second pixel region, the third pixel region, and the fourth pixel region;
    a first data line and a second data line, arranged on the substrate along a vertical direction, positioned on two sides of the first pixel region and the third pixel region respectively;

a third data line and a fourth data line disposed on the substrate along the vertical direction, positioned at two sides of the second pixel region and the fourth pixel region respectively, the second data line and the third data line being disposed between the first pixel region and the second pixel region;

a first scan line and a second scan line disposed on the substrate and extending along the horizontal direction, the first scan line passing through the first pixel region and the second pixel region, and the second scan line passing through the third pixel region and the fourth pixel region;

a first common electrode line, extending along the horizontal direction and passing through the first pixel region and the second pixel region;

a second common electrode line, extending along the horizontal direction and passing through the third pixel region and the fourth pixel region;

a first bridge line, disposed between the first common electrode line and the second common electrode line in the first pixel region and the third pixel region and electrically connected to the first common electrode line and the second common electrode line; and a second bridge line, disposed between the first common electrode line and the second common electrode line in the second pixel region and the fourth pixel region and electrically connected to the first common electrode line and the second common electrode line.

2. The flat display panel of claim 1, wherein the first downside sub-pixel is electrically connected to the second data line and the first scan line through a first transistor and the second downside sub-pixel is electrically connected to the third data line and the first scan line through a second transistor.

3. The flat display panel of claim 1, further comprising a plurality of pixel electrodes disposed at least in the first downside sub-pixel, the second downside sub-pixel, the third upside sub-pixel, and the fourth upside sub-pixel respectively, wherein the first common electrode line, the second common electrode line, the first bridge line, and the second bridge line are covered by the corresponding pixel electrodes except for an interval part between adjacent pixel electrodes on the substrate.

4. The flat display panel of claim 1, wherein the third upside sub-pixel is electrically connected to the first data line and the second scan line through a third transistor and the fourth upside sub-pixel is electrically connected to the fourth data line and the second scan line through a fourth transistor.

5. The flat display panel of claim 1, wherein the first bridge line, the second bridge line, the first common electrode line, and the second common electrode line are formed with a same patterned conductive layer.

6. The flat display panel of claim 1, further comprising:
at least two first common electrode branches, arranged along the vertical direction in the first downside sub-pixel and the second downside sub-pixel respectively and positioned at a side of the first common electrode line opposite to the first bridge line and the second bridge line; and
at least two second common electrode branches, arranged along the vertical direction in the third upside sub-pixel and the fourth upside sub-pixel respectively and positioned at a side of the second common electrode line opposite to the first bridge line and the second bridge line.

7. The flat display panel of claim 6, wherein portions of the first common electrode line and the second common electrode line positioned in the first pixel region, the second pixel region, the third pixel region, and the fourth pixel region are defined as a plurality of common electrodes.

8. The flat display panel of claim 7, wherein the first common electrode branches are respectively connected to the first bridge line and the second bridge line with the corresponding common electrodes, and the second common electrode branches are respectively connected to the first bridge line and the second bridge line with the corresponding common electrodes.

9. The flat display panel of claim 8, wherein the first common electrode branch, the common electrode, and the first bridge line positioned in the first downside sub-pixel are arranged with a cross shape, and the second common electrode branch, the common electrode, and the second bridge line positioned in the fourth upside sub-pixel are arranged with a cross shape.

10. The flat display panel of claim 8, wherein the first bridge line, the second bridge line, the first common electrode branches, and the second common electrode branches are formed with a same patterned conductive layer.

11. The flat display panel of claim 7, further comprising a plurality of metal electrodes with shapes approximately the same as the shapes of the common electrodes, and each of the metal electrodes covers one of the common electrodes.

12. The flat display panel of claim 11, further comprising a plurality of pixel electrodes electrically connected to one of the metal electrodes respectively, covering the first downside sub-pixel, the second downside sub-pixel, the third upside sub-pixel, or the fourth upside sub-pixel.

13. The flat display panel of claim 1, wherein the second data line and the third data line are adjacent to each other.

14. The flat display panel of claim 1, wherein the first pixel region comprises a first upside sub-pixel disposed on an upside of the first downside sub-pixel, the second pixel region comprises a second upside sub-pixel disposed on an upside of the second downside sub-pixel, the third pixel region comprises a third downside sub-pixel disposed on a underside of the third upside sub-pixel, and the fourth pixel region comprises a fourth downside sub-pixel disposed on a underside of the fourth upside sub-pixel.

15. The flat display panel of claim 14, wherein the first scan line is positioned between the first upside sub-pixel and the first downside sub-pixel, and the second scan line is positioned between the third upside sub-pixel and the third downside sub-pixel.

16. The flat display panel of claim 1, wherein the flat display panel is a polymer stabilized alignment (PSA) liquid crystal display (LCD) panel.

17. A flat display panel, comprising:
a substrate, at least a first pixel region and a second pixel region arranged as an array being defined on the substrate, wherein the second pixel region is positioned on an underside of the first pixel region and adjacent to the first pixel region;
a first upside sub-pixel and a first downside sub-pixel disposed in the first pixel region;
a second upside sub-pixel and a second downside sub-pixel disposed in the second pixel region, wherein the first upside sub-pixel, the first downside sub-pixel, the second upside sub-pixel, and the second downside sub-pixel are arranged along a vertical direction in order;
a first data line and a second data line arranged along the vertical direction and disposed at two sides of the first pixel region and the second pixel region respectively, wherein the first data line is used for providing input signals to the first upside sub-pixel and the second upside sub-pixel, and the second data line is used for providing input signals to the first downside sub-pixel and the second downside sub-pixel;

a first scan line and a second scan line, extending along a horizontal direction and passing through the first pixel region and the second pixel region respectively;

a first common electrode line, extending along the horizontal direction and passing through the first downside sub-pixel;

a second common electrode line, extending along the horizontal direction and passing through the second upside sub-pixel; and a bridge line, disposed between the first common electrode line and the second common electrode line and electrically connected to the first common electrode line and the second common electrode line.

18. The flat display panel of claim 17, wherein the first downside sub-pixel is electrically connected to the second data line and the first scan line through a first transistor, and the second downside sub-pixel is electrically connected to the second data line and the second scan line through a second transistor.

19. The flat display panel of claim 17, wherein the first upside sub-pixel is electrically connected to the first data line and the first scan line through a third transistor, and the second upside sub-pixel is electrically connected to the first data line and the second scan line through a fourth transistor.

20. The flat display panel of claim 17, wherein the bridge line, the first common electrode line, and the second common electrode line are formed with a same patterned conductive layer.

21. The flat display panel of claim 17, further comprising:
at least a first common electrode branch, arranged along the vertical direction in the first downside sub-pixel and positioned at a side of the first common electrode line opposite to the bridge line; and
at least a second common electrode branch, arranged along the vertical direction and in the second upside sub-pixel and positioned at a side of the second common electrode line opposite to the bridge line.

22. The flat display panel of claim 21, wherein portions of the first common electrode line and the second common electrode line positioned in the first pixel region and the second pixel region are defined as a plurality of common electrodes.

23. The flat display panel of claim 22, wherein the first common electrode branch and the second common electrode branch are connected to the bridge line with the corresponding common electrodes respectively.

24. The flat display panel of claim 23, wherein the first common electrode branch in the first downside sub-pixel, the common electrode, and the bridge line form a cross shape, and the second common electrode branch in the second upside sub-pixel, the common electrode, and the bridge line form a cross shape.

25. The flat display panel of claim 24, wherein the bridge line, the first common electrode branch, and the second common electrode branch are formed with a same patterned conductive layer.

26. The flat display panel of claim 17, wherein the first scan line and the second scan line are positioned between the first upside sub-pixel and the first downside sub-pixel and between the second upside sub-pixel and the second downside sub-pixel respectively.

27. The flat display panel of claim 17, wherein the flat display panel is a PSA LCD panel.

28. A method of repairing conductive lines of a flat display panel, the flat display panel comprising:

a substrate, at least a first pixel region, a second pixel region, a third pixel region, and a fourth pixel region arranged as an array being defined on the substrate, wherein the first pixel region and the second pixel region are arranged along a horizontal direction, and the third pixel region and the fourth pixel region are positioned on an underside of the first pixel region and the second pixel region and adjacent to the first pixel region and the second pixel region respectively;

a first downside sub-pixel, a second downside sub-pixel, a third upside sub-pixel, and a fourth upside sub-pixel respectively disposed in the first pixel region, the second pixel region, the third pixel region, and the fourth pixel region;

at least two scan lines, extending along the horizontal direction on the substrate, passing through the first pixel region and the second pixel region, and passing through the third pixel region and the fourth pixel region respectively;

a first common electrode line, extending along the horizontal direction and passing through the first downside sub-pixel and the second downside sub-pixel;

a second common electrode line, extending along the horizontal direction and passing through the third upside sub-pixel and the fourth upside sub-pixel;

a first data line and a second data line, arranged along a vertical direction on the substrate and positioned at two sides of the first pixel region and the third pixel region respectively, the second data line crossing the first common electrode line and the second common electrode line at a first crossing point and a second crossing point respectively;

a third data line and a fourth data line, arranged along the vertical direction on the substrate and positioned at two sides of the second pixel region and the fourth pixel region, the third data line crossing the first common electrode line and the second common electrode line at a third crossing point and a fourth crossing point respectively;

a first bridge line, disposed between the first and the second common electrode lines and electrically connected to the first common electrode line and the second common electrode line; and a second bridge line, disposed between the first common electrode line and the second common electrode line and electrically connected to the first common electrode line and the second common electrode line;

the method of repairing conductive lines of the flat display panel comprising:

when a short defect of the second data line and the third data line occurs near the first crossing point or the third crossing point, using a laser blade to cut off the portions of the second data line and the third data line with the short defect and the first common electrode line at two sides of the first crossing point and at two sides of the third crossing point along the vertical direction; and when a short defect of the second data line and the third data line occurs near the second crossing point or the fourth crossing point, using the laser blade to cut off the portions of the second data line and the third data line with the short defect and the second common electrode line at two sides of the second crossing point and at two sides of the fourth crossing point along the vertical direction.

29. The method of claim 28, wherein the scan lines, the first bridge line, the second bridge line, the first common electrode line, and the second common electrode line are formed with a same patterned conductive layer.

30. The method of claim 28, wherein the flat display panel further comprises:
   at least a first common electrode branch, arranged along the vertical direction in the first downside sub-pixel and positioned at a side of the first common electrode line opposite to the bridge line; and
   at least a second common electrode branch, arranged along the vertical direction in the second upside sub-pixel and positioned at a side of the second common electrode line opposite to the bridge line.

31. The method of claim 28, wherein the flat display panel further comprises a plurality of metal electrodes positioned in at least the first downside sub-pixel and the third upside sub-pixel, covering a portion of the first common electrode line and a portion of the second common electrode line respectively.

32. The method of claim 31, further comprising:
   when a short defect of the second data line and one of the metal electrode occurs near the first crossing point, using the laser blade to cut off the portions of the second data line and the metal electrode with the short defect and the first common electrode line at two sides of the third crossing point along the vertical direction;
   when a short defect of the second data line and one of the metal electrode occurs near the second crossing point, using the laser blade to cut off the portions of the second data line and the metal electrode with the short defect and the second common electrode line at two sides of the fourth crossing point along the vertical direction;
   when a short defect of the third data line and one of the metal electrodes occurs near the third crossing point, using the laser blade to cut off the portions of the third data line and the metal electrode with the short defect and the first common electrode line at two sides of the first crossing point along the vertical direction; and
   when a short defect of the third data line and one of the metal electrode occurs near the fourth crossing point, using the laser blade to cut off the portions of third data line and the metal electrode with the short defect and the second common electrode line at two sides of the second crossing point along the vertical direction.

* * * * *